US008851119B2

(12) United States Patent  (10) Patent No.: US 8,851,119 B2
Fujiwara et al.  (45) Date of Patent: Oct. 7, 2014

(54) CONTROL VALVE

(75) Inventors: Takeshi Fujiwara, Sagamihara (JP);
Masayuki Nakamura, Yamato (JP)

(73) Assignee: Kayaba Industry Co., Ltd., Tokyo (JP)

( * ) Notice: Subject to any disclaimer, the term of this patent is extended or adjusted under 35 U.S.C. 154(b) by 92 days.

(21) Appl. No.: 13/642,885

(22) PCT Filed: Jan. 27, 2012

(86) PCT No.: PCT/JP2012/051777
§ 371 (c)(1),
(2), (4) Date: Oct. 23, 2012

(87) PCT Pub. No.: WO2012/124386
PCT Pub. Date: Sep. 20, 2012

(65) Prior Publication Data
US 2013/0037131 A1 Feb. 14, 2013

(30) Foreign Application Priority Data

Mar. 16, 2011 (JP) ................................ 2011-057663

(51) Int. Cl.
*F16K 11/07* (2006.01)
*F15B 13/04* (2006.01)
*F16K 3/26* (2006.01)
*F15B 13/042* (2006.01)
*F16K 31/122* (2006.01)

(52) U.S. Cl.
CPC .............. *F15B 13/0402* (2013.01); *F16K 3/26* (2013.01); *F16K 11/07* (2013.01); *F15B 13/042* (2013.01); *F16K 31/122* (2013.01)
USPC ............. 137/625.69; 137/625.68; 137/625.66

(58) Field of Classification Search
USPC ................. 137/625.2, 625.6, 625.65, 625.68, 137/625.69, 625.48, 596.13, 115.19, 137/115.23, 625.66; 251/18, 19, 25, 31; 91/436, 446, 461

See application file for complete search history.

(56) References Cited

U.S. PATENT DOCUMENTS 2,316,944 A * 4/1943 Ernst ......................... 137/625.66
2,718,240 A * 9/1955 Margrave ................. 137/625.69
(Continued)

FOREIGN PATENT DOCUMENTS

CN 101096973 A 1/2008
JP 62056602 A 3/1987
(Continued)

OTHER PUBLICATIONS

International Search Report corresponding to PCT/JP2012/051777, dated Feb. 28, 2012.

(Continued)

*Primary Examiner* — Craig Schneider
*Assistant Examiner* — Craig J Price
(74) *Attorney, Agent, or Firm* — Lowe Hauptman & Ham, LLP

(57) ABSTRACT

A control valve includes a signal pressure passage that transmits a pilot pressure of first and second pilot chambers as a signal pressure of another device, a connecting groove that is formed in a spool and connects the first pilot chamber to the signal pressure passage when the spool is in a neutral position, a connecting hole that is formed in the spool and connects the second pilot chamber to the signal pressure passage, and a check valve that is interposed in the connecting hole and permits a flow only from the second pilot chamber to the signal pressure passage. The connecting groove connects the first pilot chamber to the signal pressure passage when the pilot pressure is led into the first pilot chamber, and blocks communication between the first pilot chamber and the signal pressure passage when the pilot pressure is led into the second pilot chamber.

1 Claim, 2 Drawing Sheets

(56) References Cited

U.S. PATENT DOCUMENTS

| | | | | |
|---|---|---|---|---|
| 2,745,433 A * | 5/1956 | Schneider et al. | ........ | 137/596.13 |
| 2,765,746 A * | 10/1956 | Omon | ...................... | 137/625.69 |
| 2,782,798 A * | 2/1957 | Ericson | .................... | 137/625.65 |
| 2,783,745 A * | 3/1957 | Stephens | .................. | 137/625.69 |
| 2,965,133 A * | 12/1960 | Rice et al. | ................. | 137/625.68 |
| 2,971,536 A * | 2/1961 | Junck et al. | ............. | 137/625.69 |
| 2,977,933 A * | 4/1961 | Price | .............................. | 91/446 |
| 3,023,781 A * | 3/1962 | Larsen | ............................ | 251/29 |
| 3,093,116 A * | 6/1963 | Rood | ........................... | 137/625.69 |
| 3,160,174 A * | 12/1964 | Schmiel et al. | .......... | 137/625.69 |
| 3,200,845 A * | 8/1965 | Nakazima et al. | ......... | 137/625.6 |
| 3,207,178 A * | 9/1965 | Nevulis et al. | ........... | 137/625.69 |
| 3,280,842 A * | 10/1966 | Weisenbach | ............. | 137/625.69 |
| 3,534,774 A * | 10/1970 | Tennis | .................... | 137/625.68 |
| 3,625,254 A * | 12/1971 | Rice | ........................ | 137/625.66 |
| 3,985,153 A * | 10/1976 | Thomas | ..................... | 91/446 |
| 3,995,532 A * | 12/1976 | Junck et al. | ............. | 137/625.69 |
| 3,998,134 A * | 12/1976 | Budzich | .................. | 137/596.13 |
| 4,015,619 A * | 4/1977 | Shore et al. | ................ | 137/625.6 |
| 4,122,865 A * | 10/1978 | Budzich | .................. | 137/596.13 |
| 4,256,142 A * | 3/1981 | Hancock | .................. | 137/596.13 |
| 4,287,813 A * | 9/1981 | Chatterjea et al. | ......... | 137/625.69 |
| 4,311,006 A * | 1/1982 | Becker | ................... | 137/625.68 |
| 4,361,169 A * | 11/1982 | Williams | ................. | 137/596.13 |
| 4,407,328 A * | 10/1983 | Shore et al. | ................ | 137/625.6 |
| 4,438,780 A * | 3/1984 | Chatterjea | .................. | 137/625.6 |
| 4,561,463 A * | 12/1985 | Brownbill et al. | ....... | 137/596.13 |
| 4,688,470 A * | 8/1987 | Budzich | .................. | 137/596.13 |
| 4,693,272 A * | 9/1987 | Wilke | .............................. | 91/446 |
| 4,889,161 A * | 12/1989 | Janecke | .......................... | 91/446 |
| 4,890,647 A * | 1/1990 | Pfuhl et al. | ............... | 137/625.69 |
| 4,941,508 A * | 7/1990 | Hennessy et al. | ......... | 137/625.69 |
| 4,958,553 A * | 9/1990 | Ueno | .............................. | 91/447 |
| 5,038,671 A * | 8/1991 | Ueno | ........................ | 137/596.13 |
| 5,065,793 A * | 11/1991 | Stephenson et al. | ..... | 137/596.13 |
| 5,078,179 A * | 1/1992 | Amrhein | ................. | 137/625.69 |
| 5,115,835 A * | 5/1992 | Ueno | ........................ | 137/596.13 |
| 5,188,147 A * | 2/1993 | Shirai et al. | ............. | 137/596.13 |
| 5,240,042 A * | 8/1993 | Raymond | ................ | 137/625.66 |
| 5,394,903 A * | 3/1995 | Tominaga | ................ | 137/596.13 |
| 5,613,519 A * | 3/1997 | Ishizaki | ................... | 137/596.14 |
| 5,921,165 A * | 7/1999 | Takahashi et al. | .............. | 91/461 |
| 6,076,552 A * | 6/2000 | Takahashi et al. | ....... | 137/625.69 |
| 6,158,462 A * | 12/2000 | Kashiwagi et al. | ...... | 137/596.13 |
| 6,164,068 A * | 12/2000 | Harries | .................... | 137/625.65 |
| 6,192,929 B1 * | 2/2001 | Matsumoto | .............. | 137/596.13 |
| 6,253,658 B1 * | 7/2001 | Kimura | .......................... | 91/461 |
| 6,397,890 B1 * | 6/2002 | Mickelson et al. | ....... | 137/625.69 |
| 6,581,639 B2 * | 6/2003 | Fiala et al. | ........................ | 91/436 |
| 6,745,564 B2 * | 6/2004 | Koo | ................................ | 91/461 |
| 6,805,161 B2 * | 10/2004 | Zenker et al. | .............. | 137/493.4 |
| 6,971,407 B2 * | 12/2005 | Christensen et al. | ..... | 137/596.13 |
| 7,337,807 B2 * | 3/2008 | Koo et al. | ................. | 137/625.69 |
| 7,581,562 B2 * | 9/2009 | Steinhilber et al. | ...... | 137/625.68 |
| 7,603,940 B2 * | 10/2009 | Stellwagen | ..................... | 91/446 |
| 7,628,174 B2 * | 12/2009 | Kauss et al. | ............. | 137/625.69 |
| 8,100,145 B2 * | 1/2012 | Desbois-Renaudin | .. | 137/625.69 |
| 8,393,348 B2 * | 3/2013 | Tougasaki et al. | ....... | 137/596.13 |
| 8,464,756 B2 * | 6/2013 | Navale | ..................... | 137/625.69 |
| 8,464,758 B2 * | 6/2013 | Breunig et al. | .......... | 137/625.69 |
| 8,485,223 B2 * | 7/2013 | Ku | ........................... | 137/596.18 |
| 2003/0168113 A1 * | 9/2003 | Post | ........................... | 137/625.66 |
| 2006/0081299 A1 * | 4/2006 | Koo et al. | ................. | 137/625.69 |
| 2006/0191582 A1 * | 8/2006 | Kauss et al. | ............. | 137/625.69 |
| 2007/0028973 A1 * | 2/2007 | Kobayashi et al. | ...... | 137/625.69 |
| 2008/0000535 A1 * | 1/2008 | Coolidge | ................. | 137/625.69 |
| 2011/0088789 A1 * | 4/2011 | Ku | ........................... | 137/625.48 |
| 2013/0048889 A1 * | 2/2013 | Fujiwara et al. | ................. | 251/29 |
| 2013/0153068 A1 * | 6/2013 | West et al. | ................ | 137/625.69 |
| 2013/0228245 A1 * | 9/2013 | Ku et al. | .................. | 137/625.69 |

FOREIGN PATENT DOCUMENTS

| | | |
|---|---|---|
| JP | 11141696 A | 5/1999 |
| JP | 11280705 A | 10/1999 |
| JP | 2000097210 A | 4/2000 |
| JP | 2001221357 A | 8/2001 |
| JP | 2001241559 A | 9/2001 |
| JP | 2009013753 A | 1/2009 |

OTHER PUBLICATIONS

Office Action corresponding to CN 201280001213.5, dated Jul. 1, 2013.

* cited by examiner

CONTROL VALVE

TECHNICAL FIELD

This invention relates to a control valve that is switched by an action of a pilot pressure in order to lead the pilot pressure to another device.

BACKGROUND ART

JP2009-013753A describes this type of control valve.

Further, a conventional valve shown in FIG. 2 is known as this type of control valve. In the control valve shown in FIG. 2, a spool 2 is incorporated into a valve main body 1 to be free to slide, and a spring force of a centering spring 3 is exerted on the spool 2. Respective ends of the spool 2 oppose pilot chambers 4, 5, and the spool 2 is switched by an action of a pilot pressure led to one of the pilot chambers 4, 5 such that one of a pair of actuator ports 6, 7 formed in the valve main body 1 communicates with a pump and the other communicates with a tank.

A signal pressure passage 8 that transmits the pilot pressure of the pilot chamber 4 or 5 as a signal pressure of another device is formed in the valve main body 1. The signal pressure passage 8 communicates with the pilot chamber 4 via a check valve 9. The check valve 9 allows working oil to flow only from the pilot chamber 4 into the signal pressure passage 8.

The pilot chamber 5 communicates with the signal pressure passage 8 via a connecting hole 10 formed in the spool 2 and a check valve 11 provided in the connecting hole 10. The check valve 11 allows working oil to flow only from the pilot chamber 5 into the signal pressure passage 8.

When the pilot pressure is led into the pilot chamber 4, the spool 2 moves in a rightward direction of the figure in a first direction relative to the direction of the spring force of the centering spring 3 such that the actuator port 7 communicates with the pump and the actuator port 6 communicates with the tank. At this time, the pilot pressure led into the pilot chamber 4 pushes open the check valve 9 so as to be led into the signal pressure passage 8, and is then led from the signal pressure passage 8 into the other device.

When the pilot pressure is led into the pilot chamber 5, the spool 2 moves in a leftward direction of the figure in a second direction (opposite to the first direction) relative to the direction of the spring force of the centering spring 3 such that the actuator port 6 communicates with the pump and the actuator port 7 communicates with the tank. At this time, the pilot pressure led into the pilot chamber 5 pushes open the check valve 11 via the connecting hole 10 so as to be led into the signal pressure passage 8, and is then led from the signal pressure passage 8 into the other device.

Thus, an actuator operated by the control valve is synchronized with the other device.

SUMMARY OF THE INVENTION

When the check valves 9, 11 are not provided, the two pilot chambers 4, 5 communicate with each other via the signal pressure passage 8. When the pilot pressure is led into one of the pilot chambers 4, 5, the other pilot chamber communicates with the tank, which is maintained at atmospheric pressure, and therefore, in a case where the two pilot chambers 4, 5 communicate with each other via the signal pressure passage 8, the pilot pressure cannot be maintained in either pilot chamber 4 or 5. The check valves 9, 11 are provided to avoid this.

In the conventional control valve described above, when the pilot chamber 4 or 5 is maintained at atmospheric pressure in order to return the switched spool 2 to a neutral position, the pressure in the signal pressure passage 8 may not be able to escape fully due to the existence of the two check valves 9, 11 in the signal pressure passage 8. As a result, the other device may malfunction.

This invention has been designed in consideration of this problem, and an object thereof is to prevent another device from malfunctioning when a spool is returned to a neutral position.

According to one aspect of this invention, a control valve including a spool that is incorporated into a valve main body to be free to slide, and a first pilot chamber and a second pilot chamber disposed to face respective ends of the spool, wherein the spool is moved by an action of a pilot pressure led into one of the first pilot chamber and the second pilot chamber, the control valve is provided The control valve comprises a signal pressure passage that is formed in the valve main body and transmits the pilot pressure in the first pilot chamber or the second pilot chamber as a signal pressure of another device, a connecting groove that is formed in the spool and connects the first pilot chamber to the signal pressure passage when the spool is in a neutral position, a connecting hole that is formed in the spool and connects the second pilot chamber to the signal pressure passage, and a check valve that is interposed in the connecting hole and permits a flow only from the second pilot chamber to the signal pressure passage, wherein the connecting groove connects the first pilot chamber to the signal pressure passage when the pilot pressure is led into the first pilot chamber such that the spool is moved, and blocks communication between the first pilot chamber and the signal pressure passage when the pilot pressure is led into the second pilot chamber such that the spool is moved.

Embodiments of the present invention and advantages thereof are described in detail below with reference to the accompanying drawings.

EMBODIMENTS OF THE INVENTION

Figure 1:
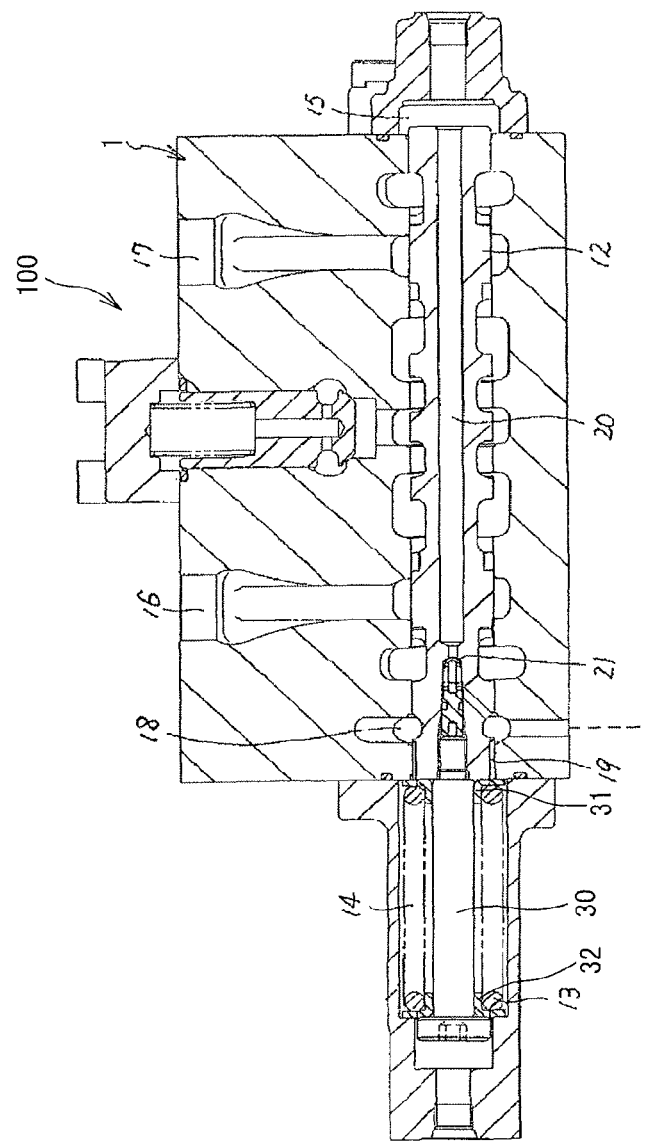
FIG. 1 is a sectional view showing a control valve according to an embodiment of this invention.
Figure 2:
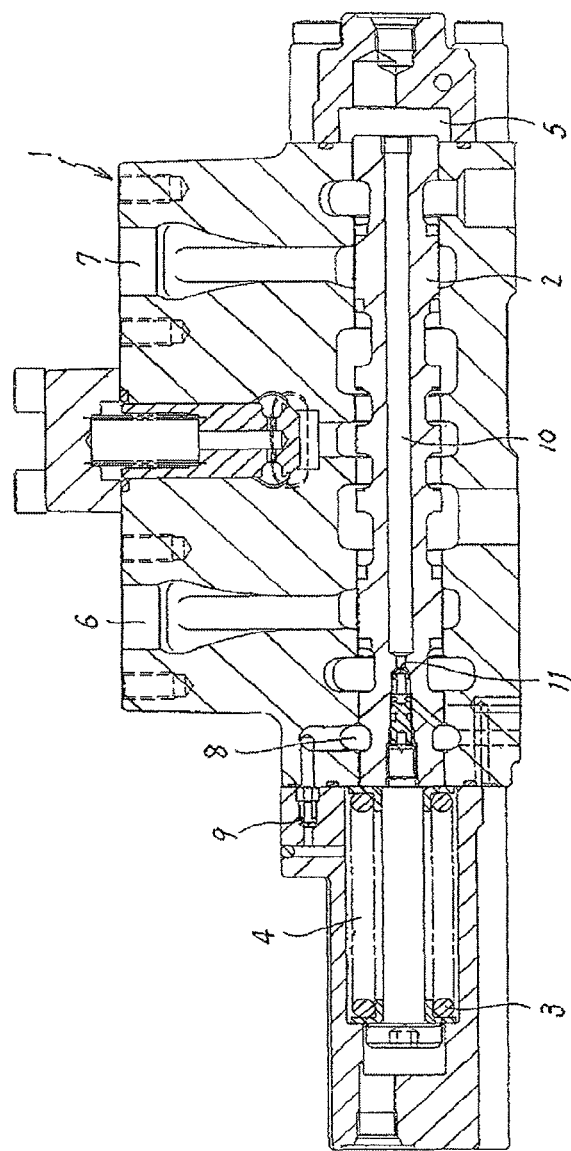
FIG. 2 is a sectional view showing a conventional control valve.

Referring to FIG. 1, a control valve 100 according to an embodiment of this invention will be described.

The control valve 100 controls an operation of an actuator by supplying and discharging working oil to and from the actuator.

The control valve 100 includes a spool 12 incorporated into a valve main body 1 to be free to slide, a first pilot chamber 14 and a second pilot chamber 15 disposed to face respective ends of the spool 12, and a centering spring 13 serving as a biasing member that is housed in the first pilot chamber 14 in order to apply a spring force to one end portion of the spool 12.

A rod 30 that extends into the first pilot chamber 14 is joined to one end portion of the spool 12. A pair of spring bearing members 31, 32 are housed in the first pilot chamber 14 to be capable of sliding along an outer periphery of the rod 30, and the centering spring 13 is interposed between the pair of spring bearing members 31, 32.

A pair of actuator ports 16, 17 that communicate with the actuator are formed in the valve main body 1.

When a pilot pressure is not exerted on either the first pilot chamber 14 or the second pilot chamber 15, the first pilot chamber 14 and the second pilot chamber 15 communicate with a tank that is maintained at atmospheric pressure, and the spool 12 is held in a neutral position by a biasing force of the centering spring 13. In this condition, supply and discharge of the working oil to and from the actuator through the actuator ports 16, 17 is blocked, and therefore the actuator is maintained in a stopped condition.

When an operator performs a lever operation such that the pilot pressure is led into one of the first pilot chamber 14 and the second pilot chamber 15, the spool 12 is caused to move relative to a direction of the spring force of the centering spring 13 by an action of the pilot pressure, and as a result, the actuator is operated. At this time, the other of the first pilot chamber 14 and the second pilot chamber 15 communicates with the tank.

More specifically, when the pilot pressure is led into the first pilot chamber 14 and the second pilot chamber 15 communicates with the tank such that the spool 12 moves in a rightward direction of FIG. 1 in a first direction relative to the direction of the spring force of the centering spring 13, the actuator port 17 communicates with a pump serving as an oil pressure supply source, and the actuator port 16 communicates with the tank. As a result, working oil discharged from the pump is supplied to the actuator through the actuator port 17 and the working oil is discharged from the actuator into the tank through the actuator port 16. Accordingly, the actuator operates in one direction.

When the pilot pressure is led into the second pilot chamber 15 and the first pilot chamber 14 communicates with the tank such that the spool 12 moves in a leftward direction of FIG. 1 in a second direction (opposite to the first direction) relative to the direction of the spring force of the centering spring 13, the actuator port 16 communicates with the pump and the actuator port 17 communicates with the tank. As a result, the working oil discharged from the pump is supplied to the actuator through the actuator port 16 and the working oil is discharged from the actuator into the tank through the actuator port 17. Accordingly, the actuator operates in another direction.

A signal pressure passage 18 is formed in the valve main body 1 to transmit the pilot pressure in the first pilot chamber 14 or the second pilot chamber 15 as a signal pressure of another device.

A connecting groove 19 that opens into the first pilot chamber 14 is formed in an annular shape in an outer peripheral surface of one end of the spool 12. The connecting groove 19 connects the first pilot chamber 14 to the signal pressure passage 18 when the spool 12 is in the neutral position.

When the pilot pressure is led into the first pilot chamber 14 such that the spool 12 moves in the rightward direction of FIG. 1, the connecting groove 19 remains connected to the signal pressure passage 18 such that the first pilot chamber 14 and the signal pressure passage 18 communicate with each other. When the pilot pressure is led into the second pilot chamber 15 such that the spool 12 moves in the leftward direction of FIG. 1, on the other hand, the connecting groove 19 separates from the signal pressure passage 18 such that communication between the first pilot chamber 14 and the signal pressure passage 18 is blocked.

A connecting hole 20 that connects the second pilot chamber 15 to the signal pressure passage 18 is formed in the spool 12. A check valve 21 that permits a flow only from the second pilot passage 15 to the signal pressure passage 18 is interposed in the connecting hole 20.

Next, actions of the control valve 100 will be described.

When the pilot pressure is led into the first pilot chamber 14 such that the spool 12 is moved in the rightward direction of FIG. 1 by the action of the pilot pressure, the actuator port 17 communicates with the pump and the actuator port 16 communicates with the tank. At this time, the connecting groove 19 remains connected to the signal pressure passage 18, and therefore the pilot pressure in the first pilot chamber 14 is led into the signal pressure passage 18 through the connecting groove 19. Since the check valve 21 is interposed in the connecting hole 20, however, the pilot pressure in the first pilot chamber 14 does not escape into the tank from the second pilot chamber 15 through the signal pressure passage 18 and the connecting hole 20.

When the spool 12 returns to the neutral position shown in FIG. 1 after moving in the rightward direction of FIG. 1, the first pilot chamber 14 communicates with the signal pressure passage 18 through the connecting groove 19, and therefore the pressure in the signal pressure passage 18 escapes into the tank from the first pilot chamber 14 through the connecting groove 19. Hence, no pressure remains in the signal pressure passage 18, and therefore the other device connected to the signal pressure passage 18 does not malfunction.

When the pilot pressure is led into the second pilot chamber 15 such that the spool 12 is moved in the leftward direction of FIG. 1 by the action of the pilot pressure, the actuator port 16 communicates with the pump and the actuator port 17 communicates with the tank. Here, the pilot pressure led into the second pilot chamber 15 flows into the connecting hole 20 so as to push open the check valve 21, and is then led into the signal pressure passage 18. At this time, the connecting groove 19 is separated from the signal pressure passage 18, and therefore the pilot pressure in the second pilot chamber 15 does not escape into the tank from the first pilot chamber 14 through the signal pressure passage 18.

When the spool 12 returns to the neutral position shown in FIG. 1 after moving in the leftward direction of FIG. 1, the connecting groove 19 communicates with the signal pressure passage 18, and therefore the pressure in the signal pressure passage 18 escapes into the tank from the first pilot chamber 14 through the connecting groove 19. Hence, no pressure remains in the signal pressure passage 18, and therefore the other device connected to the signal pressure passage 18 does not malfunction.

Following effects are obtained with the embodiment described above.

When the spool 12 is in the neutral position, the signal pressure passage 18 communicates with the first pilot chamber 14 through the connecting groove 19, and therefore the signal pressure passage 18 invariably communicates with the tank. Hence, a situation in which pressure remains in the signal pressure passage 18, causing the other device to malfunction, does not arise.

Further, when the spool 12 is moved by the action of the pilot pressure in the first pilot chamber 14, communication between the first pilot chamber 14 and the signal pressure passage 18 is maintained through the connecting groove 19 and the working oil is prevented from flowing from the first pilot chamber 14 into the second pilot chamber 15 by the check valve 21. Therefore, the signal pressure is reliably led to the other device through the signal pressure passage 18.

Furthermore, when the spool 12 is moved by the action of the pilot pressure in the second pilot chamber 15, the second pilot chamber 15 and the signal pressure passage 18 communicate with each other through the connecting hole 20, and since the connecting groove 19 is separated from the signal pressure passage 18, the working oil is prevented from flowing from the second pilot chamber 15 into the first pilot chamber 14. Therefore, the signal pressure is reliably led to the other device through the signal pressure passage 18.

Moreover, the number of check valves can be reduced by one in comparison with the prior art while ensuring that the first pilot chamber 14 and the second pilot chamber 15 do not communicate with each other when the spool 12 is moved by the action of the pilot pressure in the first or second pilot chambers 14, 15. As a result, a reduction in a number of components can be achieved.

This invention is not limited to the embodiment described above, and may be subjected to various modifications within the scope of the technical spirit thereof.

With respect to the above description, the contents of application No. 2011-057663, with a filing date of Mar. 16, 2011 in Japan, are incorporated herein by reference.

INDUSTRIAL APPLICABILITY

This invention can be applied to a control device that synchronizes an actuator connected to a direction switching valve that is switched by a pilot pressure with another device.

The invention claimed is:

1. A control valve including a spool that is incorporated into a valve main body to be free to slide, and a first pilot chamber and a second pilot chamber disposed to face respective ends of the spool, wherein the spool is moved by an action of a pilot pressure led into one of the first pilot chamber and the second pilot chamber, the control valve comprising:
   a signal pressure passage that is formed in the valve main body and transmits the pilot pressure in the first pilot chamber or the second pilot chamber as a signal pressure of another device;
   a connecting groove that is formed in the spool and connects the first pilot chamber to the signal pressure passage when the spool is in a neutral position;
   a connecting hole that is formed in the spool and connects the second pilot chamber to the signal pressure passage; and
   a check valve that is interposed in the connecting hole and permits a flow only from the second pilot chamber to the signal pressure passage,
   wherein the connecting groove connects the first pilot chamber to the signal pressure passage when the pilot pressure is led into the first pilot chamber such that the spool is moved, and blocks communication between the first pilot chamber and the signal pressure passage when the pilot pressure is led into the second pilot chamber such that the spool is moved.

* * * * *